Patented Jan. 15, 1952

2,582,215

UNITED STATES PATENT OFFICE 2,582,215

METHOD OF RENDERING CERAMIC MATERIALS WATER REPELLENT

James Franklin Hyde, Corning, N. Y., assignor to Dow Corning Corporation, Midland, Mich., a corporation of Michigan No Drawing. Application February 23, 1950, Serial No. 145,905

2 Claims. (Cl. 117—72)

This invention relates to the treatment of ceramic materials with siloxanes.

In the copending application of James F. Hyde, Serial No. 734,237, filed March 12, 1947 and now abandoned, it is shown that ceramic materials are rendered water repellent by treating the surfaces thereof with diorganosiloxanes. In his copending application, Serial No. 43,752 filed August 11, 1948, it is shown that ceramic materials may be rendered water repellent by treatment with solutions of alkali metal salts of siloxanes. Both of the above treatments, however, suffer from the disadvantage that the water-repellent characteristic of the ceramic materials does not persist when they are submerged for prolonged periods of time in sea water.

In the case of treatment with dimethylsiloxanes, the water repellency, as shown by infinite electrical resistance, is retained for several days in some instances. However, such treatment suffers from the serious disadvantage that in many instances glass insulators which have been so treated fail after a few hours in salt water. This erratic behavior renders the treatment of ceramic surfaces with diorganosiloxanes untrustworthy for use in marine applications.

It is an object of this invention to provide ceramic insulators which will retain infinite resistance for unlimited periods of time upon immersion in a 3.5 per cent salt solution. Another object is to provide a method for preparing salt-stable water-repellent ceramics which gives consistently good results. Another object is to provide insulators which may be employed under conditions where they are exposed to sea water.

In accordance with this invention, a ceramic surface is contacted with an aqueous solution of a salt of the formula

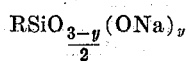

in which $y$ has a value from 0.9 to 1.5 and R is an alkyl radical of from 1 to 3 carbon atoms inclusive. The concentration of the salt solution is from 1 to 4 per cent by weight of salt based upon the weight of the solution. The surface is then dried and heated at a temperature of at least 150° C. for at least five minutes. The ceramic surface is then rinsed with an acid, dried, and contacted with a fluid dimethylpolysiloxane, and the surface is thereafter heated to at least 150° C. for at least five minutes.

The siloxane salts employed herein are prepared by reacting silanes of the type $RSiX_3$, where X is a hydrolyzable radical, with sodium hydroxide. Alternatively, the salts may be prepared by reacting partially condensed monoorgano siloxanes with sodium hydroxide. The above methods are well known in the art.

The salts employed herein may respond to the formula $RSiOONa$ or to a mixture of this salt with salts of the formula $RSiO\frac{1}{2}(ONa)_2$ and $RSi(ONa)_3$. In the event a mixture is employed, the various salts are present in such amount that the atomic ratio of sodium to silicon varies from 0.9 to 1.5.

The above defined salts are soluble in water and are best employed as an aqueous solution containing from 1 to 4 per cent by weight salt. If desired, water-soluble alcohols such as methyl, ethyl, propyl, etc., may be employed in conjunction with water in order to hasten solution of the salt. In the salts employed in this invention, the R group is methyl, ethyl, or propyl. When the alkyl radical exceeds three carbon atoms in length, the tendency of the salt to hydrolyze in aqueous solution is so great as to render higher alkyl salts unsuitable for use in this invention.

The ceramic surfaces may be contacted with the aqueous salt solution by any convenient method. Such methods include dipping, spraying, or painting. After the surface has been thoroughly wet with the solution, it is then dried and baked for at least five minutes at a temperature of at least 150° C. It is to be understood that the time and temperature are minimum and that temperatures ranging up to 450° C. may be employed and times up to one hour. No advantage is obtained by heating the surfaces for longer than one hour.

It is important that the ceramic surface be thoroughly clean before application of the salt solution. One convenient method for cleaning the materials is to first boil them in distilled water, followed by gentle boiling in the siloxane salt solution. It has been found that the siloxane salts not only act as water-repellent agents, but also act as cleaning agents for ceramic surfaces. It has been found that satisfactory results are obtained if the ceramic material is immersed in the boiling siloxane salt solution for a period of fifteen to thirty minutes.

The salt-treated surface, after drying and heating, is then rinsed with an acid and thereafter washed with water until the surface is free of electrolytes. It has been found that any acid which does not attack ceramic materials may be employed for this purpose, but the preferred acids are fatty acids such as acetic, propionic, etc.

After rinsing with the acid solution, the surface is dried and then contacted with a liquid methylpolysiloxane. The siloxanes employed herein are essentially free of monomethylsiloxane units but may contain small amounts of trimethylsiloxane units. In general, the siloxane has a degree of substitution of 2 to 2.1 methyl radicals per silicon atom. The siloxane may be applied by any convenient method, such as by dipping, spraying, or painting. In general, it has been found most convenient to employ the siloxane in the form of a solution having a concentration of from 1 to 4 per cent siloxane based on the weight of the solution. Any inert solvent, such as hydrocarbons, ethers, and ketones, may be employed in this step. Preferably, the solvent should have a boiling point below 200° C. in order to facilitate its removal.

After application of the fluid siloxane, the ceramic surface is again baked at temperatures of at least 150° C. for at least five minutes. If desired, temperatures ranging upwards of 450° C. may be used, and the heating may be continued for one hour or more.

Ceramic surfaces which have been treated in accordance with the above method have an exceedingly high resistance to the effects of sea water. It has been found that the electrical resistance of the surfaces remains infinite after a period of one year immersion in a 3.5 per cent sea salt solution. By contrast, ceramic surfaces which have been treated with siloxane salts only show poor electrical resistance after a few hours' immersion, and ceramic surfaces which have been treated with siloxanes only show poor resistance after a few days under the same conditions. Furthermore, in all cases where the present method has been employed, the surface resistance of the ceramic material has been infinite. By contrast, in the case of a large percentage of samples treated with the siloxane only, the resistance of the samples was very poor after one or two days' immersion. Thus, the method of this invention not only gives longer life but more consistently good results than any known method for rendering ceramic insulators water repellent.

The method employed to test the resistivity of the ceramic surfaces is as follows:

The samples were removed from the sea salt water and without any rinsing were suspended by metal foil bands on spring clips in a humidity cabinet with the water at 40° C. to give condensing conditions. The surface resistance was then measured on a direct current voltage amplifier with the samples in series with the input and 90 volts applied. The test methods are more fully set forth by O. K. Johannson and Julius J. Torok in "Proceedings of the Institute of Radio Engineers and Waves and Electrons," vol. 34, No. 5, page 298 (May 1946).

The following examples are to be considered as illustrative only of this invention.

*Example 1*

Ten glass rods, 2 inches long, were each immersed for twenty minutes in a boiling 2 per cent aqueous solution of $CH_3SiOONa$. The rods were removed and baked ten minutes at 150° C., then rinsed with dilute acetic acid, and finally dried at 110° C. The salt-treated rods were then immersed for five minutes in a 2 per cent diethyl ether solution of a dimethylpolysiloxane oil having a viscosity of about 1,000 cs. The rods were then baked thirty minutes at 250° C.

All of the rods were tested by immersing them in a 3½ per cent aqueous solution of sea salt and testing them periodically over a period of eight months. At the end of this time the rods were removed from the salt solution and without rinsing were placed in a humidity chamber and tested for electrical resistance as shown above. In all cases the rods showed a resistance of greater than 1,000,000 megohms, which is the highest resistance recorded by the instrument employed.

*Example 2*

Satisfactory electrical resistance is obtained when glass rods are treated in the manner of Example 1, employing $C_2H_5SiOONa$ and $$C_3H_7SiOONa$$

as the siloxane salts.

That which is claimed is:

1. A method of rendering ceramic surfaces water repellent which comprises contacting the surfaces with an aqueous solution of a siloxane salt of the formula $$RSiO_{\frac{3-y}{2}}(ONa)_y$$

in which $y$ has a value from 0.9 to 1.5, and R is an alkyl radical of from 1 to 3 carbon atoms inclusive, said solution having a concentration of from 1 to 4 per cent by weight of salt based upon the weight of the solution, drying the surface and baking it at a temperature of at least 150° C. for at least 5 minutes, rinsing the surface with a lower fatty acid, drying the surface and contacting it with a fluid methylpolysiloxane having a degree of substitution of from 2 to 2.1 methyl radicals per silicon atom, and heating the surface at a temperature of at least 150° C. for at least 5 minutes.

2. The method in accordance with claim 1 in which R is methyl.

JAMES FRANKLIN HYDE.

REFERENCES CITED

The following references are of record in the file of this patent:

UNITED STATES PATENTS

| Number | Name | Date |
|---|---|---|
| 2,436,304 | Johannson | Feb. 17, 1948 |
| 2,438,055 | Hyde et al. | Mar. 16, 1948 |
| 2,441,422 | Krieble et al. | May 11, 1948 |
| 2,507,200 | Elliott et al. | May 9, 1950 |